US010704467B2

(12) United States Patent
Jones et al.

(10) Patent No.: US 10,704,467 B2
(45) Date of Patent: Jul. 7, 2020

(54) INTERCOOLED TURBINE WITH THERMAL STORAGE SYSTEM

(71) Applicant: General Electric Company, Schenectady, NY (US)

(72) Inventors: Douglas Alan Jones, Houston, TX (US); Ching-Jen Tang, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 243 days.

(21) Appl. No.: 15/498,734

(22) Filed: Apr. 27, 2017

(65) Prior Publication Data
US 2018/0313270 A1   Nov. 1, 2018

(51) Int. Cl.
| F02C 7/143 | (2006.01) |
| F02C 6/18 | (2006.01) |
| F02C 7/18 | (2006.01) |
| H02K 7/18 | (2006.01) |
| F01D 25/12 | (2006.01) |

(52) U.S. Cl.
CPC .............. *F02C 7/143* (2013.01); *F01D 25/12* (2013.01); *F02C 6/18* (2013.01); *F02C 7/185* (2013.01); *H02K 7/1823* (2013.01); *F05D 2260/42* (2013.01)

(58) Field of Classification Search
CPC .. F02C 6/14; F02C 7/143; F02C 7/185; F05D 2260/211; F05D 2260/42
See application file for complete search history.

(56) References Cited

U.S. PATENT DOCUMENTS

2012/0247114 A1* 10/2012 Pierson ..................... F02C 7/14
60/772

FOREIGN PATENT DOCUMENTS

| JP | H11257099 A | 9/1999 |
| WO | 2016089659 A1 | 6/2016 |

OTHER PUBLICATIONS

EP Extended Search Report, EP 18169574.3, dated Sep. 25, 2018 (10 pp.).

* cited by examiner

*Primary Examiner* — Scott J Walthour
(74) *Attorney, Agent, or Firm* — Eversheds Sutherland (US) LLP

(57) ABSTRACT

The present application provides a thermal storage system for use with a gas turbine engine having an intercooler. The thermal storage system may include a secondary cooler in communication with the intercooler, a thermal energy storage tank in communication with the secondary cooler and the intercooler, and a temperature conditioning device positioned about the gas turbine engine and in communication with the thermal energy storage tank.

15 Claims, 3 Drawing Sheets

INTERCOOLED TURBINE WITH THERMAL STORAGE SYSTEM

TECHNICAL FIELD

The present application and resultant patent relate generally to gas turbine engines and more particularly relate to an intercooled turbine with a thermal storage system that can heat or cool an incoming air stream so as to improve overall efficiency and performance.

BACKGROUND OF THE INVENTION

The overall efficiency and the power output of an intercooled gas turbine engine typically may depend in part on the ambient temperature. The performance of the intercooled gas turbine engine in increased ambient temperature environments may suffer without the use of a cooling cycle, such as one providing inlet chilling and sufficiently low intercooler temperatures. A compressor intercooler combined with a high turbine pressure ratio and with low exhaust temperatures may improve overall efficiency. To provide such cooling, inlet chillers, cooling towers, dry coolers, and the like may be provided. The addition of these cooling components, however, often results in a periphery of the engine that is large, costly, and consumes parasitic power and quantities of water. Likewise, low ambient temperatures may cause ice to form in or upstream of the compressors. An air extraction may be used to heat the incoming air flow. Such an extraction, however, also may be considered a parasitic loss.

SUMMARY OF THE INVENTION

The present application and the resultant patent thus provide a thermal storage system for use with a gas turbine engine having an intercooler. The thermal storage system may include a secondary cooler in communication with the intercooler, a thermal energy storage tank in communication with the secondary cooler and the intercooler, and a temperature conditioning device positioned about the gas turbine engine and in communication with the thermal energy storage tank.

The present application and the resultant patent further provide a method of maintaining an air inlet of an intercooled gas turbine engine at a desired temperature. The method may include the steps of charging a thermal energy storage tank with a heat exchange fluid during periods of a first ambient temperature, flowing the heat exchange fluid about the air inlet during periods of a second ambient temperature, and/or flowing the heat exchange fluid about an intercooler of the gas turbine engine during periods of the second ambient temperature.

The present application and the resultant patent further provide a gas turbine engine. The gas turbine engine may include a low pressure compressor, a high pressure compressor, an intercooler positioned between the low pressure compressor and the high pressure compressor, and a thermal storage system in communication with the intercooler and the low pressure compressor. The thermal storage system may include a thermal energy storage tank in communication with the intercooler and a temperature conditioning device positioned about the low pressure compressor and in communication with the thermal energy storage tank.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
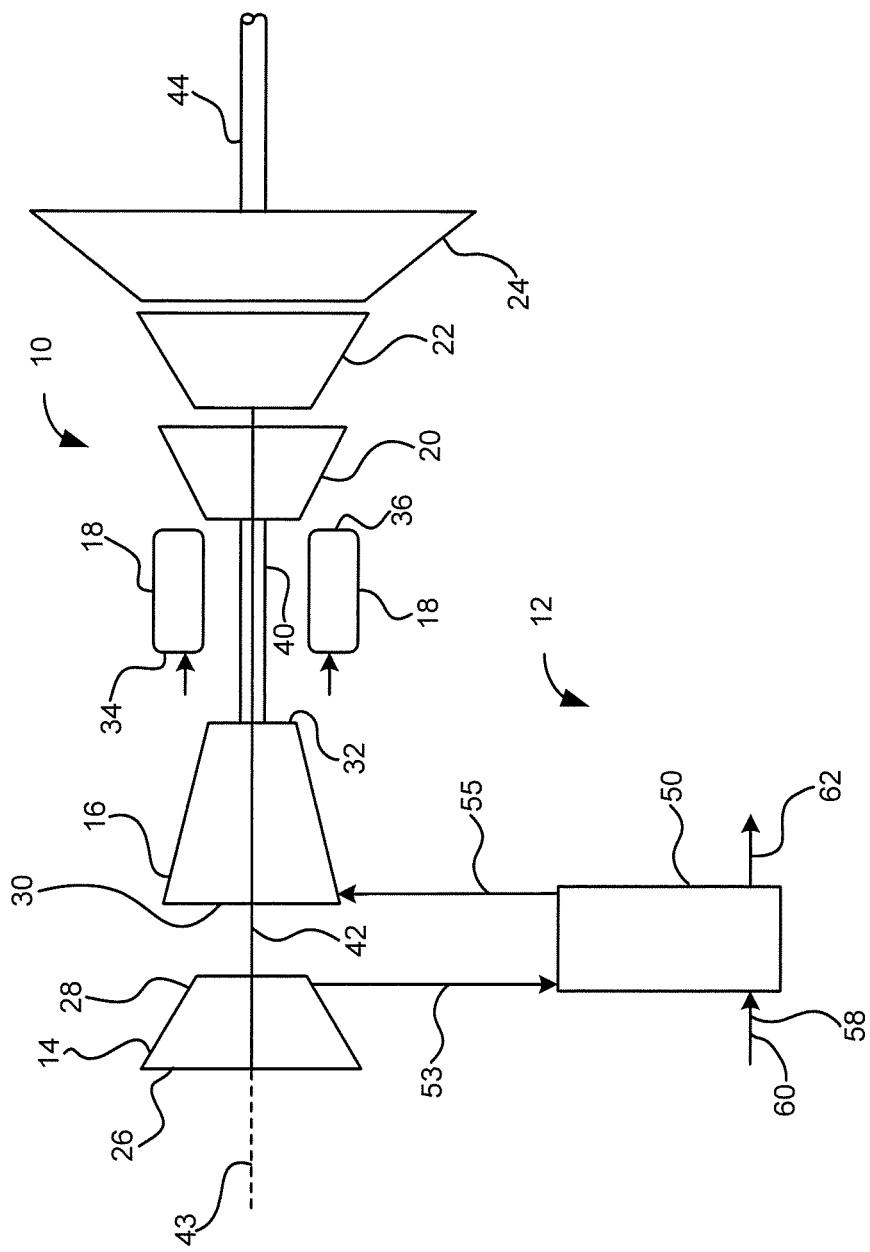
FIG. 1 is a schematic diagram of an intercooled gas turbine engine.

Referring now to the drawings, in which like numerals refer to like elements throughout the several views, FIG. 1 is a schematic diagram of a gas turbine engine 10 including an intercooler system 12. The gas turbine engine 10 may include, in serial flow relationship, a low pressure compressor or a booster 14, a high pressure compressor 16, a can-annular combustor 18, a high-pressure turbine 20, an intermediate pressure turbine 22, and a power turbine or free turbine 24. The low-pressure compressor or booster 14 may have an inlet 26 and an outlet 28. The high-pressure compressor 16 may include an inlet 30 and an outlet 32. Each combustor can 18 may have an inlet 34 that is substantially coincident with a high-pressure compressor outlet 32 and an outlet 36. The combustor 18 may be an annular combustor, a dry low emissions (DLE) combustor, and the like.

The high-pressure turbine 20 may be coupled to the high-pressure compressor 16 with a first rotor shaft 40. The intermediate turbine 22 may be coupled to the low pressure compressor 14 with a second rotor shaft 42. The rotor shafts 40 and 42 each may be substantially coaxially aligned with respect to a longitudinal centerline axis 43 of the gas turbine engine 10. The gas turbine engine 10 may be used to drive a load (not shown) which may be coupled to a power turbine shaft 44. Alternatively, the load may be coupled to a forward extension (not shown) of the rotor shaft 42.

In operation, ambient air may be drawn into the low-pressure compressor inlet 26, compressed therein, and channeled downstream to the high-pressure compressor 16. The high-pressure compressor 16 further compresses the air and delivers the now high-pressure air to the combustor 18. The combustor 18 mixes the flow of air with a flow of fuel and ignites the mixture to generate high temperature combustion gases. The combustion gases may be channeled from the combustor 18 to drive one or more turbines 20, 22, and 24.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as the LMS100 aero-derivative gas turbine, a 7 or a 9 series heavy duty gas turbine engine, and the like. The gas turbine engine 10 may have different configurations and may use other types of components. Other types of gas turbine engines also may be used herein. Multiple gas turbine engines, other types of turbines, and other types of power generation equipment also may be used herein together.

The power output of the gas turbine engine 10 is at least partially related to the temperatures of the gas flow at various locations along the gas flow path. More specifically, an operating temperature of the gas flow at the high-pressure compressor outlet 32 may be closely monitored during the operation of the gas turbine engine 10. Reducing an operating temperature of the gas flow entering the high-pressure compressor 16 may facilitate decreasing the power input required by the high-pressure compressor 16.

To facilitate reducing the operating temperature of the gas flow entering the high-pressure compressor 16, the intercooler system 12 may include an intercooler 50 that is coupled in flow communication to the low pressure compressor 14. Airflow 51 into the low-pressure compressor 14 may be pressurized therein and the pressurized flow 53 may be channeled to the intercooler 50 to provide cooling before to the cooled air 55 is returned to the high-pressure compressor 16.

During operation, the intercooler 50 may have a cooling fluid 58 flowing therethrough for removing heat extracted from the gas flow path. The cooling fluid 58 maybe air and the intercooler 50 may be an air-to-air heat exchanger. Alternatively, the cooling fluid 58 may be water and the intercooler 50 may be an air-to-water heat exchanger. The intercooler 50 may extract heat energy from the compressed airflow 53 and may return the cooled compressed air 55 to the high-pressure compressor 16. More specifically, the intercooler 50 may include a number of tubes (not shown) through which the cooling fluid 58 circulates. Heat may be transferred from the compressed air 53 through a number of tube walls (not shown) to the cooling fluid 58 supplied to the intercooler 50 through the inlet 60. Accordingly, the intercooler 50 facilitates rejecting heat between the low-pressure compressor 14 and the high-pressure compressor 16. Reducing the temperature of the air entering the high-pressure compressor 16 thus facilitates reducing the energy expended by the high-pressure compressor 16 to compress the air to the desired operating pressures. Such reduction may facilitate an increased pressure ratio of the gas turbine engine so as to provide in an increase in the energy extracted from the gas turbine engine 10 and a higher net operating efficiency.

Figure 2:
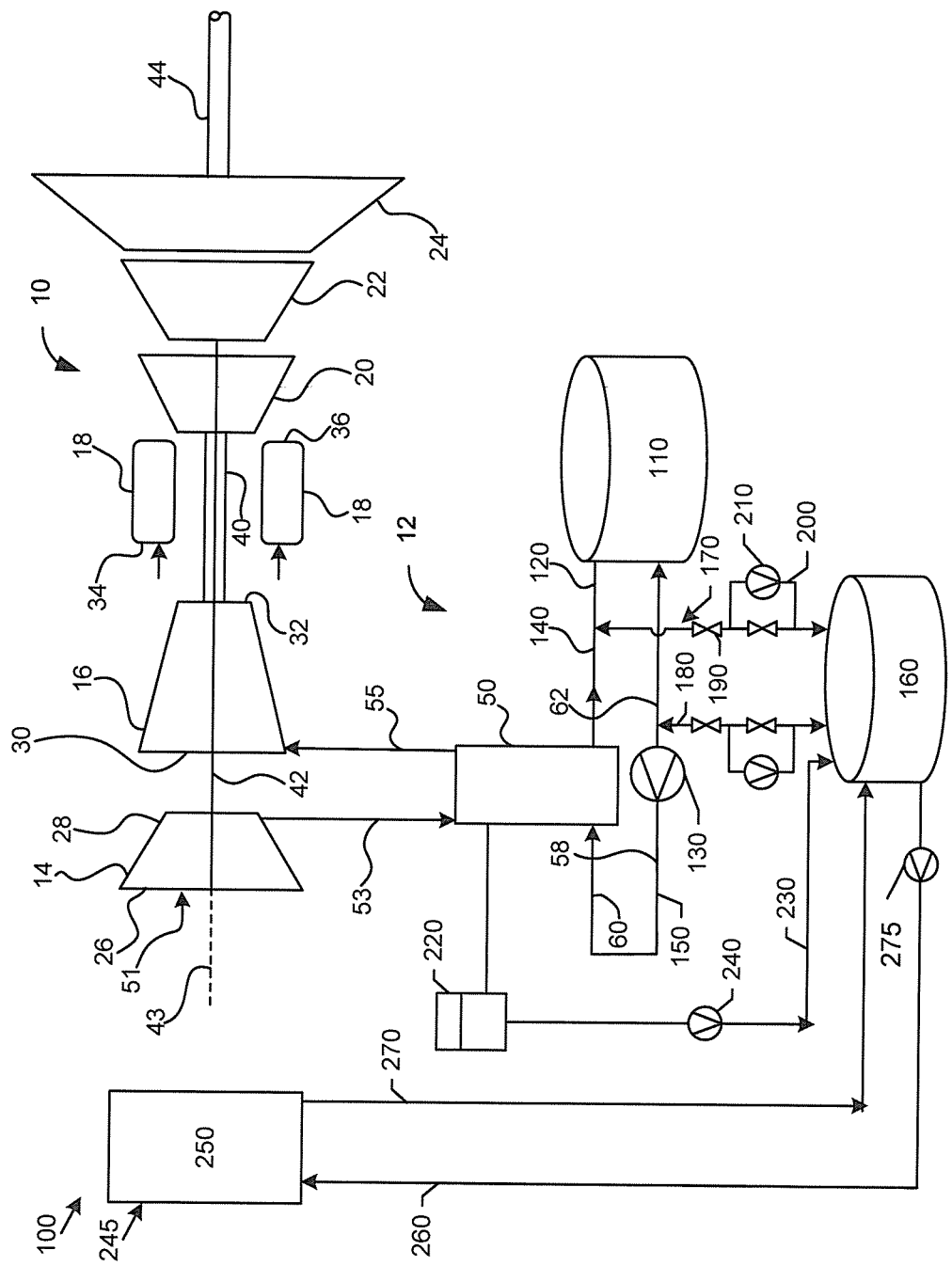
FIG. 2 is a schematic diagram of the intercooled gas turbine of FIG. 1 with a thermal storage system as may be described herein.

FIG. 2 is a schematic diagram of an example of a thermal storage system 100 that may be used with the gas turbine engine 10. The thermal storage system 100 may include a secondary cooler 110. The secondary cooler 110 may exchange heat with the cooling fluid 58 flowing through the intercooler 50. The secondary cooler 110 may have a secondary cooling fluid 120 therein. (The cooling fluid 120 may be the same or different from the flow of cooling fluid 58 above.) The secondary cooler 110 may have any suitable size, shape, or configuration. The secondary cooling fluid 120 may circulate between the intercooler 50 and the secondary cooler 110 via a secondary pump 130. The secondary pump 130 may have any suitable size, shape, configuration, or capacity. A secondary inlet line 140 and a secondary outlet line 150 may be used to circulate the secondary cooling fluid 120. Other components and other configurations may be used herein.

The thermal storage system 100 also may include a thermal energy storage tank ("TES tank") 160. The TES tank 160 may be a conventional stratified water thermal storage system, i.e., a stratification tank, with warm water rising to the top of the tank and cooler water sinking to the bottom. The TES tank 160 may have any suitable size, shape, or configuration. Other types of thermal energy storage devices may be used herein. A first TES tank line 170 may be in communication with the secondary inlet line 140. A second TES tank line 180 may be in communication with the secondary outlet line 150. A number of TES valves 190, TES bypasses 200, and TES pumps 210 may be used. The TES components may have any suitable size, shape of configuration. The TES tank lines 170, 180 thus circulate the cooling fluid 58 and/or the secondary cooling fluid 120 between the intercooler 50, the secondary cooler 110, and the TES tank 160 as desired. Other components and other configurations may be used herein.

The thermal storage system 100 also may include a condensate collector 220. The condensate collector 220 may be in communication with the intercooler 50. The condensate collector 220 may collect the condensate produced in the intercooler 50 depending upon ambient humidity levels and other parameters. The condensate collector 220 may be in communication with the TES tank 160 via a condensate line 230 and a condensate pump 240. The flow of condensate may be used to charge the TES tank 160. The condensate collector 220 and the components thereof may have any suitable size, shape, configuration, or capacity. Other components and other configurations may be used herein.

The thermal storage system 100 also may include a temperature conditioning device 245. In this example, the temperature conditioning device 245 may be an evaporative cooler 250 and the like. The evaporative cooler 250 may be positioned about the inlet 26 of the low pressure compressor 14 so as to cool the incoming air flow 51. The evaporative cooler 250 may be of conventional design. The evaporative cooler 250 may have any suitable size, shape, configuration, or capacity. The evaporative cooler 250 may be in communication with the TES tank 160 via an in-coming evaporative cooler line 260, and out-going evaporative cooler line 270, and an evaporative cooler pump 275. The evaporative cooler components may have any suitable size, shape, configuration, or capacity. Other components and other configurations may be used herein.

In use, the TES tank 160 may be charged with cooled water from the secondary cooler 110 while the gas turbine engine 10 is operated or shut down, likely at night, at relatively low ambient temperatures and electricity prices. The secondary cooler 110 may be discharged while the secondary cooler 110 is operated or not to take advantage of the day/night temperature and electricity price shifts. The cooled water may be pumped to the evaporative cooler 250 during the day to cool the incoming air flow 51 while the TES tank 160 may be refilled via the condensate collector 220. Alternatively, the cooled water also may be used to cool the high pressure compressor 16 via the intercooler 50 and/or a generator and the like. Other components and other configurations may be used herein.

Figure 3:
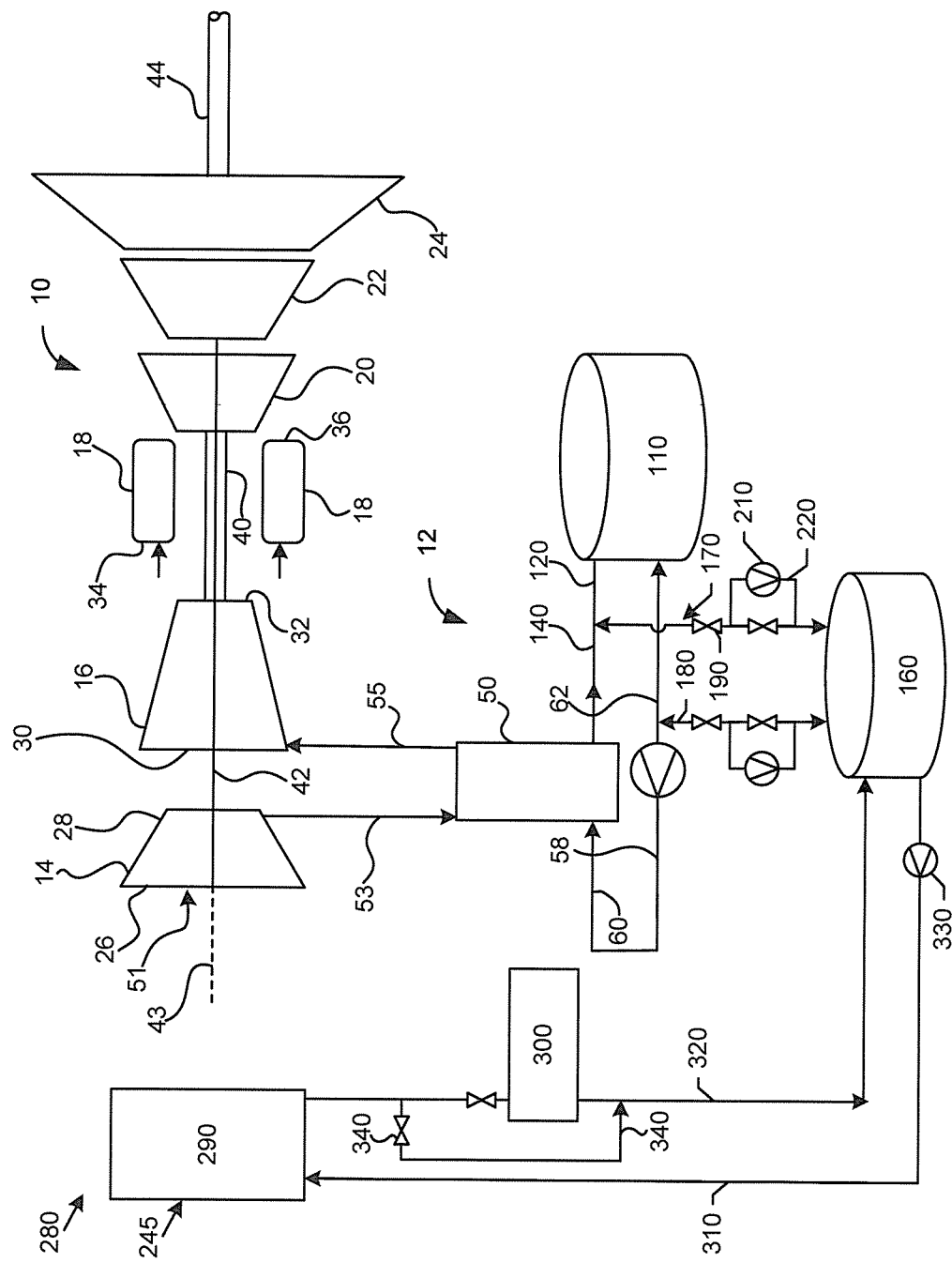
FIG. 3 is a schematic diagram of the intercooled gas turbine of FIG. 1 with an alternative embodiment of a thermal storage system as may be described herein.

FIG. 3 shows an alternative embodiment of a thermal storage system 280 as may be described herein. Instead of the condensate collector 220 and the temperature conditioning device 245 as the evaporative cooler 250, this example may include an inlet heat exchange coil 290 as the temperature conditioning device 245. The inlet heat exchange coil 290 may be in communication with a chiller 300. The inlet heat exchange coil 290 may be positioned about the inlet 26 of the low pressure compressor 14 to heat or cool the incoming air flow 51. The inlet heat exchange coil 290 may be of conventional design and may have any suitable size, shape, configuration, or capacity. The chiller 300 may provide a cooling fluid to the inlet heat exchange coil 290 when needed. The chiller 300 may be of conventional design and may have any suitable size, shape, configuration, or capacity. Suitable incoming lines 310, outgoing lines 320, coil pumps 330, chillers by-passes 340, and chiller valves 350 may be used. Other components and other configurations may be used herein.

The thermal storage system 280 may be used to heat or cool the incoming air flow 51 entering the low pressure compressor 14 or cool the air flow 53 entering the high pressure compressor 16 and/or a generator and the like. As above, the thermal storage system 280 may provide cooled water from the TES tank 160 to the inlet heat exchange coil 290 or the intercooler 50 so as to provide cooling during the day and store the cooled water at night. In heating mode, the thermal storage system 280 may store warm water from the intercooler 50 and use the stored warmed water in the inlet heat exchanger 250 to prevent ice formation.

The thermal storage system 280 may have different modes of operation. In a first mode, the TES tank 160 may be isolated from both the secondary cooler 110 and the chiller 300 such that the TES tank 160 is neither charged nor discharged. In a second mode, only the chiller 300 is used for chilling the inlet air heat exchange coil 290 while the cooled water from the TES tank 160 is used to cool the intercooler 50 without the use of the secondary cooler 110. In a third mode, only the chiller 300 is used for chilling the inlet air heat exchange coil 290 while the cooled water from the TES tank 160 and the secondary cooler 110 is used to cool the intercooler 50. In a fourth mode, cooled water from the TES tank 160 is used to cool both the inlet air heat exchange coil 290 and the intercooler 50. In a fifth mode, cooled water from the TES tank 160 is used to cool the inlet air heat exchange coil 290 while cooled water from both the TES tank 160 and the secondary cooler 110 is used to cool the intercooler 50. This method may not include the chiller. In a sixth mode, the TES tank 160 may be charged with cooled water from the secondary cooler 110. In a seventh mode, warm water may be chilled serially in the secondary cooler 110 and the chiller 300 and then stored in the TES tank 160. After charging here, the resultant cooled water may be below ambient temperature. In a heating mode, warm water from the secondary cooler 110 may be stored in the TES tank 160 and then pumped to the inlet air heat exchange coil 290 to prevent ice formation. Other modes of operation may be used herein.

The thermal storage system 280 thus may maintain the air entering the low pressure compressor 14 and the high pressure compressor 16 and/or generator and the like at the desired temperature to maximize overall gas turbine engine 10 output and efficiency. One or more TES tanks 160 and the like may be used herein. The thermal storage system 280 may improve overall performance with intercooled gas turbines on hot days and the like.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:
1. A gas turbine engine, comprising:
   a turbine;
   a compressor;
   an intercooler; and
   a thermal storage system;
   the thermal storage system comprising:
   a secondary cooler in fluid communication with the intercooler via a secondary cooling fluid via a secondary tank inlet line and a secondary tank outlet line;
   a thermal energy storage tank in fluid communication with the secondary cooler and the intercooler via the secondary cooling fluid via a first thermal energy storage tank line and a second thermal energy storage tank line; and
   a temperature conditioning device positioned about the gas turbine engine and in fluid communication with the thermal energy storage tank via the secondary cooling fluid.

2. The gas turbine engine of claim 1, wherein the compressor is one of a low pressure compressor or a high pressure compressor, the gas turbine engine comprises the low pressure compressor and the high pressure compressor, and the intercooler is positioned between the low pressure compressor and the high pressure compressor.

3. The gas turbine engine of claim 2, wherein the temperature conditioning device is positioned about the low pressure compressor.

4. The gas turbine engine of claim 1, wherein the temperature conditioning device comprises an evaporative cooler.

5. The gas turbine engine of claim 4, further comprising a condensate collector in communication with the intercooler and the thermal energy storage tank via the secondary cooling fluid.

6. The gas turbine engine of claim 1, wherein the temperature conditioning device comprises an inlet heat exchange coil.

7. The gas turbine engine of claim 6, wherein the inlet heat exchange coil provides heat or cooling about the gas turbine engine.

8. The gas turbine engine of claim 6, further comprising a chiller in communication with the inlet heat exchange coil and the thermal energy storage tank.

9. The gas turbine engine of claim 8, further comprising a chiller by-pass line around the chiller.

10. The gas turbine engine of 8, further comprising a coil pump in communication with the inlet heat exchange coil and the thermal energy storage tank.

11. The gas turbine engine of claim 1, wherein the secondary tank inlet line is in communication with the first thermal energy storage tank line and the secondary tank outlet line is in communication with the second thermal energy storage tank line.

12. The gas turbine engine of claim 11, wherein the first thermal energy storage tank line comprises a first pump thereon and wherein the second thermal energy storage tank line comprises a second pump thereon.

13. The gas turbine engine of claim 1, wherein the secondary cooling fluid comprises a flow of water.

14. The gas turbine engine of claim 13, wherein the thermal energy storage tank comprises a stratification tank.

15. The gas turbine engine of claim 1, wherein the temperature conditioning device and the thermal energy storage tank are in communication via the secondary cooling fluid in an incoming evaporative cooler line and an outgoing evaporative cooler line.

* * * * *